Patented Jan. 5, 1943

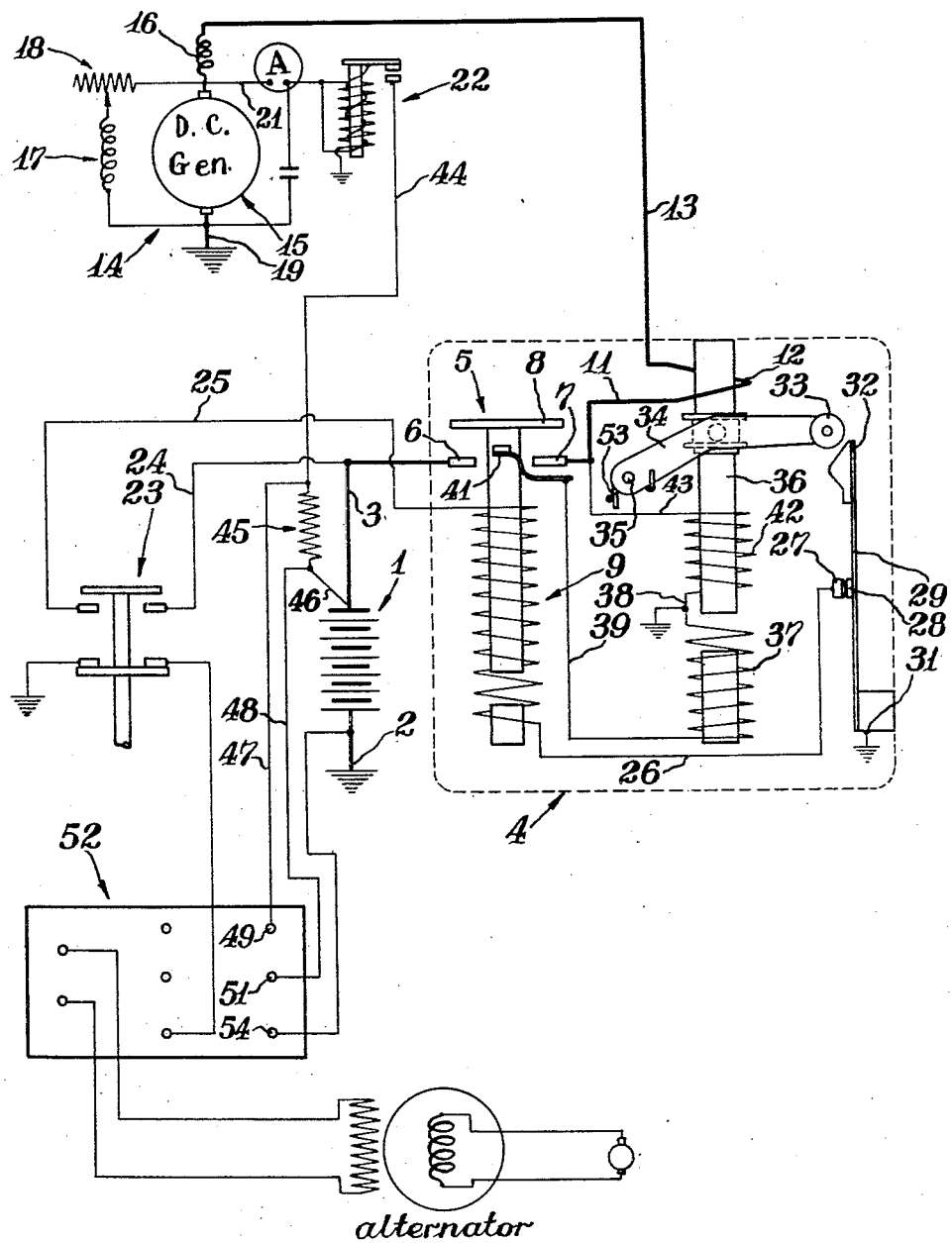

2,307,364

UNITED STATES PATENT OFFICE 2,307,364

ELECTRICAL STARTING AND GENERATING SYSTEM

Manuel H. Elkin, Elmira Heights, N. Y., assignor to Bendix Aviation Corporation, South Bend, Ind., a corporation of Delaware Application June 24, 1941, Serial No. 399,491

4 Claims. (Cl. 290—31)

The present invention relates to an electrical starting and generating system and more particularly to a motor generator system in which a single electrical unit is used first as a motor to crank the engine and then as a generator to supply electrical power.

In systems of this kind it is customary to provide a driving connection from the electrical unit to the engine having a high mechanical advantage for cranking the engine, and a connection from the engine to the electrical unit having a lower ratio for driving the electrical unit as a generator.

One form of cranking connection in common use is the Bendix drive which embodies a pinion so connected to the electrical unit as to be automatically meshed with an engine gear upon actuation of the unit as a motor, and automatically demeshed when the engine starts. Commercial units for automatically controlling the actuation of such starter drives have been developed based on the disclosure of Loehr and Burdick, Patent No. 1,894,970, but these units as now manufactured are not adapted to control the starting operation in single unit motor generator systems.

It is an object of the present invention to provide a novel starter control for single unit motor generator systems which is reliable and efficient in operation and simple and economical in construction.

It is another object to provide such a device which adapts to such a single unit system certain principles and features which have been used successfully in connection with other forms of starting and generating systems.

Further objects and advantages may be apparent from the following description taken in connection with the accompanying drawing which illustrates semi-diagrammatically an electrical system embodying a preferred form of the invention.

In the drawing there is illustrated a starting system for an internal combustion engine not illustrated, comprising a battery 1 grounded at 2 and connected by a lead 3 to a starter control unit indicated generally by numeral 4. This control unit comprises a magnetic starting switch 5 having a fixed contact 6 to which the battery lead 3 is connected, a second fixed contact 7 and a bridging contact 8 arranged to be actuated by a solenoid coil 9. Contact 7 is connected by lead 11 through a single turn series coil 12 to a lead 13 which is connected to an electrical motor generator unit 14.

The motor generator comprises an armature 15, a series field 16 which is used for starting purposes only, and a shunt field 17, the strength of which may be regulated by a variable resistance 18 in order to control the out-put of the unit as a generator. One terminal of the motor generator is grounded as indicated at 19 and the other terminal is connected through a lead 21 and an ammeter A to an automatic cut-out switch 22.

A control circuit for the magnetic starting switch 5 is provided, comprising a manually operable control switch 23 connected by a lead 24 to the battery lead 3 and by a lead 25 to one end of the starting switch solenoid 9. The opposite end of the solenoid 9 is connected by a lead 26 to a fixed contact 27 which is normally engaged by a contact 28 on a vibrator arm 29 which is grounded at 31 to complete the control circuit. The free end of the vibrator arm 29 is provided with a weight member 32 which is positioned to be engaged by the end 33 of a relay arm 34 which is mounted to swing about a pivot 35. Means for actuating the relay arm 34 is provided in the form of a magnetic core 36 and a coil 37 adapted to attract the core and move the relay arm downwardly so as to open contacts 27, 28. One end of coil 37 is grounded at 38 and the other end is connected by a lead 39 to a spring-mounted contact 41 placed in the path of movement of the bridge contact 8 so that the coil 37 is energized by closure of the magnetic switch 5.

Means for holding the relay arm 34 in its lower position to maintain contacts 27, 28, open is provided in the form of a coil 42 connected by a lead 43 to the starting circuit lead 11. Since this lead is at all times connected through the series field 16 of the motor generator to the output terminal of said electrical unit, coil 42 will be actuated by the voltage of the generator as long as the motor generator is being driven as a generator. Coil 42 is also energized by battery voltage during the cranking operation to assist the coil 37 to open contacts 27, 28 when the engine starts.

A charging circuit for the battery 1 from the motor generator is provided comprising a lead 44 from the cut-out switch 22, resistor 45 for controlling the charging rate, and a lead 46. When it is desired to charge the battery at a higher than normal rate, the resistor 45 may be bridged by means of leads 47, 48 connected to terminals 49, 51 on a control panel 52, which terminals may be connected by suitable switch means to bring into effect the high charging rate. It will be understood that the control switch 23 and the control panel 52 are of conventional form and form no part of the present invention so that further description thereof is deemed unnecessary, it being merely stated that when the control switch is in the position illustrated, the device is rendered inoperative, while movement of the switch 23 to its lower position causes closure of the control circuit and consequent actuation of the starting mechanism to place the unit in service.

In operation, closure of the control switch 23 completes the control circuit from battery 1 through leads 3, 24, and 25, magnetic switch coil 9, lead 26 and contacts 27, 28 to the ground at 31 whereby said coil is caused to close the magnetic switch 5. The starting circuit is thereby completed from battery 1 through lead 3, contacts 6, 7, 8, lead 11, coil 12, lead 13 to the motor generator through its series field 16. The motor generator is thereby motorized to crank the engine.

Closure of magnetic switch 5 causes energization of the relay coils 37 and 42, but since the single turn series coil 12 is at this time energized by the heavy cranking current, the coils 37 and 42 are unable to overcome the effect on the core 36 of the coil 12, and the core 36 is not moved from the position illustrated. When the engine starts, however, the load on the starting circuit is released, thus reducing the flux through the series coil 12 and increasing the voltage applied to coils 37 and 42 whereby these coils are able to overcome the coil 12 and move the core 36 so as to swing the relay arm 34 down and open contacts 27, 28. This breaks the control circuit causing the starting switch 5 to open. The coil 42 however is maintained energized by current generated by the motor generator as driven by the engine and thereby holds the relay contacts 27, 28 open as long as the engine remains self-operative. Should the engine stop for any reason, however, the consequent deenergization of the coil 42 allows the relay arm 34 to move up to its original position by virtue of spring 53. The coil 9 of the magnetic starting switch is not immediately reenergized, however, since the weight 32 is set into vibratory motion when it is released by the relay arm, so that the contacts 27, 28 do not come into effective engagement for a pre-determined time after such release. This time is so arranged as to permit the engine and motor generator to come completely to rest before closure of the starting switch. This insures that the cranking connection from the motor generator to the engine is properly established in an automatic manner.

When the engine drives the motor generator at or near its normal speed, the voltage of the generator causes the cut-out switch 22 to close, whereby the charging circuit for the battery is completed, and power is supplied to the line terminals 49 and 54 on the control panel 52.

Although but one embodiment of the invention has been shown and described in detail, it will be understood that other embodiments are possible and that various changes may be made in the design and arrangement of the parts without departing from the spirit of the invention as defined in the claims appended hereto:

What is claimed is:

1. In an electrical starting and generating system, a motor generator unit, means for energizing said unit as a motor to crank the engine including a battery and a magnetic starting switch, manually controlled means for closing the switch, means for maintaining the switch closed until the engine starts, means including a coil connected to the motor generator unit by closure of the starting switch causing the starting switch to open responsive to self-operation of the engine, means including a coil energized by said unit acting as a generator for preventing actuation of the switch-closing means, means including a coil actuated by voltage of the unit as a generator higher than battery voltage for establishing a charging connection from the generator to the battery, means for breaking this connection if the generator voltage drops below the battery voltage, and means for delaying reclosure of the starting switch for a predetermined time after the motor generator has come substantially to rest.

2. In a single unit starting and generating system for internal combustion engines, a motor generator unit, a starting circuit therefor including a battery, and a magnetic starting switch, a control circuit for the magnetic starting switch including a pair of normally closed contacts, electro-magnetic means connected to the starting circuit by closure of the starting switch for opening said contacts when the engine starts, electro-magnetic means connected to the starting circuit and energized by the motor generator unit for holding the contacts open while said unit is driven by the engine as a generator and means for preventing effective re-closure of the contacts for a predetermined time after the unit has come substantially to rest.

3. In a single unit starting and generating system for internal combustion engines a motor generator, a battery, a starting circuit including the motor generator, the battery and an electro-magnetic starting switch; a control circuit for the switch including said battery, a control switch and an electro-magnetic relay; a coil in series in the starting circuit for holding the relay closed during cranking, a coil tapped into the starting circuit by closure of the starting switch, operative to open the relay when the engine starts and a coil connected to the starting circuit and energized by the motor generator for holding the relay open while the engine drives the generator.

4. A single unit starting and generating system as set forth in claim 3 including, further, means for delaying effective re-closure of the relay for a predetermined time after deenergization of the holding coil.

MANUEL H. ELKIN.